Patented Sept. 29, 1936

2,055,732

UNITED STATES PATENT OFFICE 2,055,732

PROCESS OF RECOVERING TIN

Ludwig Schertel, Essen, Germany

No Drawing. Application April 26, 1935, Serial No. 18,366. In Germany May 7, 1934

11 Claims. (Cl. 75—98)

This invention relates to recovery of tin; and it comprises a process of recovering tin from scrap metals containing the same, wherein said scrap metals are treated with caustic alkali with recovery of alkali metal stannates, these stannates are heated to temperatures at least sufficiently high to produce a sintered reaction product while being maintained in a reducing atmosphere containing sufficient carbon-containing gas, such as $CO_2$, to convert the alkali metal content of said stannates into the corresponding carbonates, the tin content being thereby reduced to the metallic state, and the resulting product is treated for recovery of metallic tin, the remaining carbonates usually being converted into caustic alkali which may be recycled and used in the first step of the process, all as more fully set forth and as claimed.

There are available in the art many different types of scrap metals containing tin, which are derived from various technical sources. Examples of these scrap metals are babbit, bearing metals, scrap solder, terne plate scrap, tin scrap, etc. Several methods have been proposed in the art for the recovery of metallic tin from these scrap metals. One method in use comprises the chlorination of the metals by means of chlorine gas with recovery of tin chloride. This method, however, is not commercially feasible for the recovery of metallic tin.

Several methods have been proposed for treating these scrap metals wherein the tin, in at least one stage of the process, is obtained in the form of an alkali metal stannate. The present invention is particularly adapted for use in connection with any of these processes and affords a convenient and inexpensive method of converting these alkali stannates into metallic tin and recovering the alkali used in the process.

A method affording a convenient way of obtaining alkali stannates from scrap metals containing tin is one wherein tin-containing scrap is digested with a strong hot caustic alkali solution containing a nitrite, for example, the tin being oxidized to form crystallized alkali metal stannate which is then recovered from the solution, the latter containing any lead or other impurities dissolved from the scrap metal. In another known method, which can be readily adapted to the recovery of alkali metal stannates, tin-containing scrap is digested with a caustic alkali solution containing oxidizing agents, such as sodium nitrate, under conditions such that both the tin and any lead go into solution. The lead can be removed by contacting with metallic tin, for example, leaving a solution of alkali metal stannate.

The source of the alkali metal stannate used in the later steps of my process is, of course, immaterial. As stated, however, my process is particularly adapted to be used in connection with those processes in which a caustic alkali solution is employed in the first step, owing to the fact that the caustic used can be readily recovered in my process and recycled.

My process has certain important advantages over the acknowledged prior art processes since in these prior processes metallic tin is obtained only by use of electrolytic procedures or by several chemical precipitations. My improved process operates under alkaline conditions throughout and converts an alkali stannate directly to metallic tin by a simple furnacing operation. And the only expensive chemical used in the process, namely the alkali, can be readily recovered.

I have discovered that alkali metal stannates can be heated with reducing agents with the production of alkali metal carbonates and metallic tin, these substances being readily separated. This process can be conducted in various ways and various reducing agents may be employed, but in all cases a mixture of metallic tin and an alkali metal carbonate is obtained in one stage of the process. These components can be separated by any of several methods and further treated if desired.

My process can be conducted at temperatures ranging from those necessary to sinter the reaction mass to those somewhat above the fusion temperature of this mass; that is from about 600° to 1000° C. A temperature of 650° C. is usually sufficient to produce satisfactory sintering of the product while temperatures in the neighborhood of 850° C. usually produce complete fusion. With a gas rich in CO the reaction goes to completion at a temperature of about 750° C. The addition of $CO_2$ permits a reduction in this reaction temperature.

Many different types of reducing agents can be employed in my process. They may be solid, liquid or gaseous. It is only necessary that the atmosphere within the furnace be distinctly reducing at the temperatures employed. Pulverized carbon is an example of a solid reducing agent which may be employed. Petroleum, tar and asphalt are suitable liquid reducing agents. In what I consider the best embodiment of my invention, however, I use a gaseous reducing agent, such as carbon monoxide, hydrogen, gaseous hydrocarbons or the like. Any of the commercial industrial gases can be employed, such as coal gas, coke oven gas, cracking still gases, oil gas, natural gas, producer gas and the like. In many cases these gases can be employed without alteration.

It is necessary that the reducing gases used in my process contain sufficient carbon-containing gases to insure production of an alkali metal carbonate during the course of the reaction. Generally the presence of at least 2 to 5 per cent of $CO_2$ is desirable in the reducing gases. Otherwise this amount of $CO_2$ should be formed during the course of the reduction reaction. It is advantageous in all cases to use a reducing gas containing at least about 2 per cent carbon dioxide in order to accelerate the reaction. When CO is employed as a reducing gas it apparently reacts with the stannate to form $CO_2$ before it becomes effective in converting the alkali into carbonate. When solid or liquid reducing agents are used which do not produce CO or $CO_2$ during the reaction, these products should be supplied in about the amounts indicated. Coke oven gas can be employed at a temperature of about 650° C., for example, and it is advantageous to add $CO_2$ in order that metallic tin should be formed. When hydrogen is employed it is necessary to add $CO_2$.

In my process it is desirable to separate impurities from the alkali metal stannates prior to the reduction step. Such impurities can be eliminated usually by merely dissolving the stannate in water, whereby insoluble oxides such as those of copper, antimony and iron are precipitated. Or traces of lead, antimony or arsenic can be eliminated from the solution by precipitation as the sulfides. This may be accomplished, for example, by the addition of sodium sulfide.

The first steps of my process comprise digesting a tin-containing metal with a caustic alkali solution and then treating the resulting crude alkali stannate to recover a substantially pure solid alkali metal stannate. This is followed by a furnacing operation.

The reduction or furnacing step of my process may be conducted in any suitable type of furnace. When sintering temperatures are used I have found that the usual direct or indirect fired rotary furnace produces satisfactory results. However, other furnaces, such as various reverberatory, blast, electric and muffle furnaces, are applicable. Some provision should be made for cooling the reduction product out of contact with the air.

When sintering temperatures are employed a granular mass of alkali metal carbonate is recovered mixed with finely divided metallic tin. The tin can be recovered by lixiviating this product with water, the carbonate dissolving and the tin being precipitated. The finely divided tin thus recovered can be briquetted while still in finely divided form or it can be melted in a reducing atmosphere and then cast into block tin. This finely divided tin can also be readily burned to give $SnO_2$.

When fusion temperatures are exceeded, say at about 850° C. the tin as well as the carbonate is recovered in molten form. The tin being heavier, can be drawn off from beneath the carbonate slag. A tap may be provided at the bottom of the furnace crucible for this purpose.

The alkali employed in my process is usually caustic soda although caustic potash and other caustic alkalis can be used. The corresponding carbonates of these metals are recovered after the furnacing step. These carbonates can be recrystallized, if desired, but it is advantageous to dissolve them in water, causticizing with added CaO, for example, in order to recover caustic alkali. The latter may then be recycled to be used in the first step of the process.

In one specific embodiment of my invention, representing a practical operation, I employed a crystalline sodium stannate containing about 36 per cent tin and 35 per cent NaOH of which about 12 per cent was free NaOH. After drying this product, I heated it to 700° C. in an indirectly fired rotary furnace while passing through the furnace a reducing gas containing from 2 to 5 per cent of $CO_2$. The product was cooled under exclusion of air and was found to be a grey-black granular material. When added to water this product easily decomposed. The soda ash dissolved while a precipitate of metallic tin remained at the bottom of the vessel. The latter was washed free from caustic and was finally melted in a reducing atmosphere to form block tin. It was found that all but about 1 to 2 per cent of the tin content of the sodium stannate was reduced to metallic tin in this operation.

Various changes may be made in the above procedure without departing from the purview of my invention. Modifications which fall within the scope of the following claims will be immediately evident to those skilled in the art.

What I claim is:

1. In the recovery of tin, the process which comprises treating a tin-containing metal with a caustic alkali, recovering a substantially pure solid alkali metal stannate, furnacing said stannate at a temperature at least as high as its sintering point while maintaining it in a reducing atmosphere having a composition resulting in the production of metallic tin and an alkali metal carbonate.

2. In the recovery of tin, the process which comprises furnacing an alkali metal stannate at a temperature at least as high as its sintering point but not substantially above its melting point while maintaining it in a reducing atmosphere containing sufficient carbon containing gas to produce an alkali metal carbonate and metallic tin.

3. The process of claim 1 wherein the temperature employed is within the sintering range.

4. The process of claim 1 wherein the temperature employed is within the fusion range.

5. The process of claim 1 wherein a sintering temperature is employed and the resulting finely divided tin is recovered and converted into $SnO_2$ by burning in the presence of air.

6. The process of claim 1 wherein the alkali carbonate obtained is dissolved, causticized and the resulting caustic alkali is employed in a repetition of the process.

7. The process of claim 2 wherein a reducing gas is employed containing at least from about 2 to 5 per cent of $CO_2$.

8. The process which comprises furnacing an alkali metal stannate at a temperature of between about 600° and 1000° C. in a reducing atmosphere and in the presence of $CO_2$ in amount sufficient to produce an alkali metal carbonate and metallic tin.

9. The process of claim 8 wherein a reducing gas is employed containing from about 2 to 5 per cent of $CO_2$.

10. In the process of recovering tin values from tin-containing scrap metal by treatment of said scrap metal with caustic alkali solutions, the improvement which comprises producing an alkali metal stannate from the reaction products resulting from said treatment of said scrap metal, furnacing said alkali metal stannate at a temperature ranging between about 650° and 850° C. in a reducing atmosphere containing at least 2 per cent $CO_2$, and recovering metallic tin and alkali metal carbonate from the reaction products.

11. The process which comprises treating a tin-containing metal with a caustic alkali, recovering a substantially pure solid alkali metal stannate, furnacing said stannate at temperatures within the range of 600° to 1000° C. in a reducing atmosphere containing at least 2 per cent of carbon dioxide, thereby producing metallic tin and alkali metal carbonate, separating the alkali metal carbonate from the tin, causticizing said alkali metal carbonate, recovering the resulting caustic alkali and employing the recovered caustic alkali in a repetition of the process.

LUDWIG SCHERTEL.